United States Patent [19]

Toth

[11] 4,062,338
[45] Dec. 13, 1977

[54] STEAM COOLING SYSTEM FOR INTERNAL COMBUSTION ENGINES

[75] Inventor: Jozsef Toth, Miskolc, Hungary

[73] Assignee: Energiagazdalkodasi Intezet, Budapest, Hungary

[21] Appl. No.: 677,739

[22] Filed: Apr. 16, 1976

[51] Int. Cl.² .................................................. F02D 19/00
[52] U.S. Cl. .................................... 123/25 C; 60/712
[58] Field of Search ................. 123/25 C, 25 B, 25 D, 123/25 P, 193 H, 193 CH; 60/712

[56] References Cited

U.S. PATENT DOCUMENTS

| 1,349,515 | 8/1920 | Lombard | 123/25 C |
| 1,398,667 | 11/1921 | Beals | 123/25 C X |
| 2,748,755 | 6/1956 | McCutcheon | 123/25 C |
| 2,879,753 | 3/1959 | McKinley | 123/25 C |

FOREIGN PATENT DOCUMENTS

| 386,165 | 6/1908 | France | 123/25 C |
| 536,306 | 4/1922 | France | 123/25 C |
| 8,714 of | 1914 | United Kingdom | 123/25 C |

*Primary Examiner*—Charles J. Myhre
*Assistant Examiner*—Ira S. Lazarus

[57] ABSTRACT

The invention relates to a system for the periodical steam cooling of the inner spaces of internal combustion engines, aiming partly to reduce the contaminations in the exhaust gas and partly to increase the ratio of the heat to be converted into mechanical work.

The cooling system according to the invention, especially for two-stroke Diesel-engines, can be characterized in that cooling water is injected directly into the cylinder space; the system is equipped with a cooling organ which is able to perform a free movement when a predetermined increase in pressure is surpassed, furthermore there is an injecting organ which injects a quantity of cooling water proportional to the displacement of said cooling organ; there is also an organ for the delayed opening and accelerated closing of the injecting bore of the injecting organ, in addition there is an organ for the gradual opening, whereby the injecting volume of the cooling water injecting organ is limited by the volume of the water content of the dry steam of a suitable atmospheric pressure.

6 Claims, 4 Drawing Figures

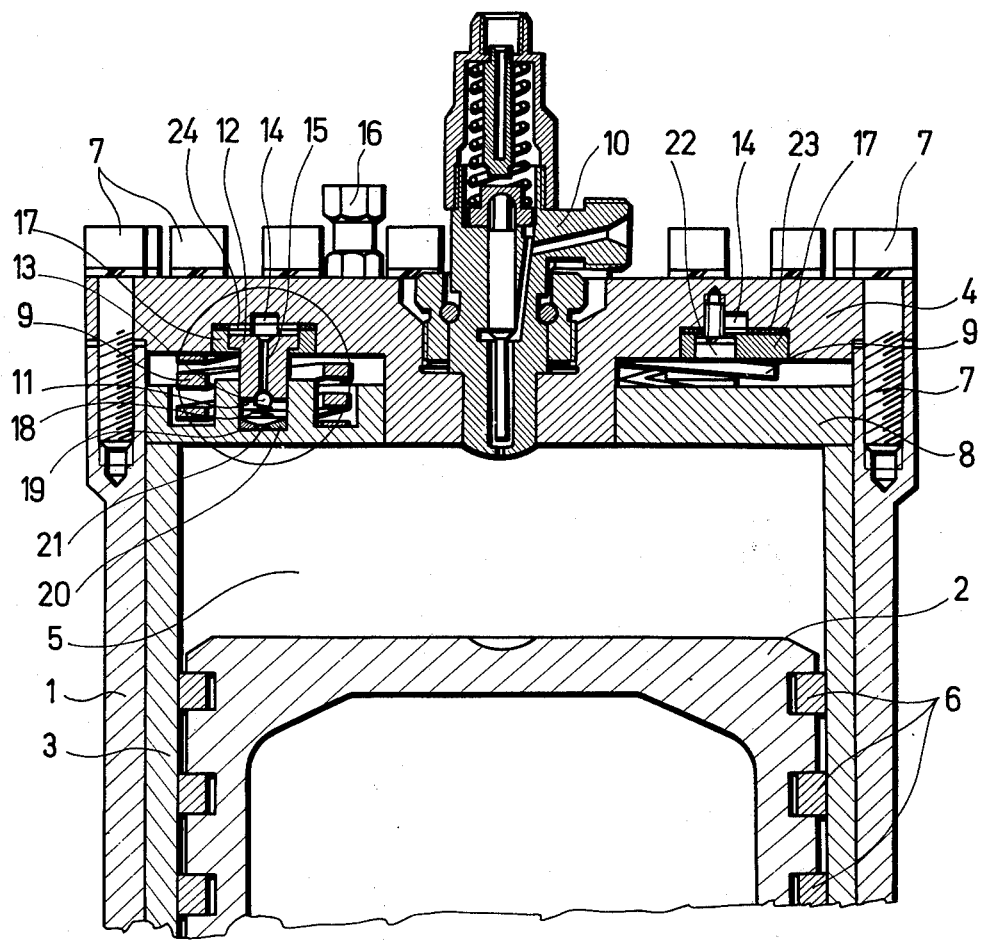
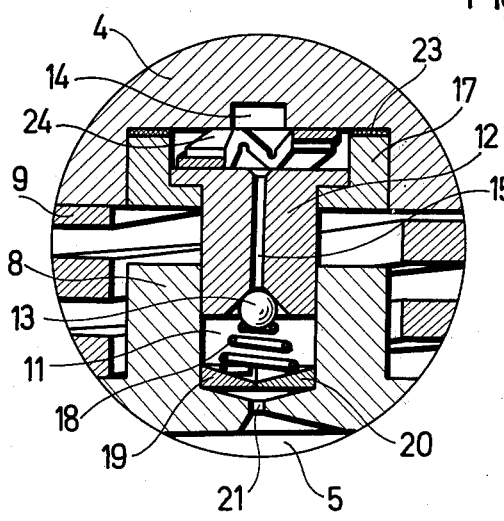
Fig.1
Fig.2
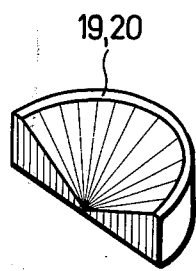
Fig.3
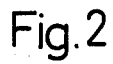
Fig.4

STEAM COOLING SYSTEM FOR INTERNAL COMBUSTION ENGINES

The invention relates to a system for the periodical steam cooling of the inner space of internal combustion engines, setting the objective partly to reduce the containing components of the exhaust gases, partly to increase the ratio of the heat being converted into mechanical work.

According to the thermal balance of the internal combustion engines, at the Diesel -engines one third of the heat introduced is converted into mechanical work, one third of the heat is consumed when cooling takes place, and the remaining part is leaving the engine together with the exhaust gases.

In spite of the fact that in the known cooling systems the heat egressing at cooling is considered as a waste, the ratio of the heat to be converted into mechanical work can be increased by the improvement of cooling only, since by increasing the heat egressing at cooling, the ratio of the heat to be converted into mechanical work will also increase to the debit of the heat leaving the engine together with the exhaust gases.

On the other hand, excessive cooling may be considered as disadvantageous, since at cold starting and a low number of revolution of the engine the temperature needed for combustion is not ensured due to the cold cylinder walls.

A significant drawback of the known air - and water cooling systems lies in that the flame goes out along the cylinder walls and due to incomplete combustion toxic hydrocarbon-and carbonmonoxyde particles are left in the exhaust gases.

From the point of view of increasing the ratio of the heat introduced and converted into mechanical work, as well as of establishing exhaust gases free of hydrocarbon-and carbonmonoxyde particles, the two- stroke free piston engines working at a high temperature and under high pressure are to be considered as one of the phases of development. The pressure of combustion may reach, even surpass — due to the structural form of said engines — the pressure of 500 atm; such an engine has been described in U.S. patent 3,868,932. As a consequence of the high pressure of combustion the ratio of the heat to be converted into mechanical work will increase too, whereby the cylinder space is warming up to such an extent that a complete combustion of the fuel takes place.

When injecting the fuel, the temperature of the cylinder space of the free piston Diesel -engines may reach 1000° C, where — due to the low intensity of the known cooling systems — the temperature may increase to the multiple in course of the combustion; as a consequence of the instantaneous high temperature the nitrogen in the air enters into reaction and toxic nitrogenoxydes are formed.

The aim of our invention is to eliminate the drawbacks mentioned before and to develop a cooling system acting in compliance with the high pressure — and temperature values of the free piston Diesel — engines and being able to reduce the contaminating components in the exhaust gases, simultaneously increasing the ratio of the heat to be converted into mechanical work.

According to the invention the task is accomplished in that cooling of the free piston internal combustion engine is taking place by means of water vapour, using an injecting organ injecting the cooling water directly into the cylinder space, furthermore there is a cooling organ which is able to perform a free movement during the course of the combustion of the fuel, when the pressure is surpassing a certain pre-determined value; the cooling system has been equipped with an injecting organ, injecting a certain amount of cooling water, proportional to the displacement of the cooling organ, which is performing a free movement; furthermore the system is provided with an organ for the retardation of opening and acceleration of closing the injecting bore of the injecting organ, in addition having an organ serving for the gradual opening of the injecting bore of the injecting organ. The injecting volume of the organ injecting the cooling water is limited by the volume of the water contents of the dry system of a suitable atmospherical pressure.

The characteristics of the inner cooling system according to the invention aim for the realization of the partial tasks described below;

to avoid difficulties arising at cold starting and to eliminate incomplete combustion of the fuel one has to provide against cooling the cold engine and to ensure that injection of cooling water should take place only after having reached the temperature at which nitrogenoxydes are forming, in order to avoid extinction of the flame and incomplete combustion of the fuel, respectively, the single cooling periods should begin gradually, thus ensuring the development of the single combustion periods, in order to avoid forming of nitrogenoxydes, the quantity of the cooling water injected should be always sufficient for keeping the inner space at a temperature at which forming of nitrogenoxyde becomes impossible, in order to convert the cooling heat into effective mechanical work, injection of cooling water should be stopped at a convenient point of time to achieve forming of steam with suitable working capacity and to ensure the effect to be exerted onto the pistons, in order to clean the exhaust gases with a high efficiency and to prolong useful time of the cylinders, the quantity of cooling water should be limited in such a way that the water drops of acid reaction, resulting from the expanding steam, and precipitating onto the contaminating gas particles should not condense inside the cylinder but only under the influence of the expansion taking place within the silencer.

In order to comply with the requirements enumerated above, the cooling organ must "feel" the proceedings of the first phase of the combustion period and "draw the conclusion" in relation to the proceedings of the expansion of the steam-gas mixture after injection of water has taken place; the cooling organ has to control the temporal and quantitative course of the injection of the cooling water.

The cooling organ according to the invention performs under the influence of the travel of pressure waves of the first phase of combustion a free movement, whereby the temporal course of the displacement is defined not only by the combustion already begun but also by the state of motion of the working piston confining one side of the combustion chamber, since the length of the cylinder space limited by the working piston, the direction of displacement and the acceleration exert an effect on the pressure waves generated by the combustion. The state of motion of the working pistons is primarily defined — during the first phase of combustion as well as in course of the expansion following combustion — by the instantaneous service load of the engine; consequently, the the free displacement of the cooling organ during the first phase of combustion reflects the proceeding characteristics of the expansion following combustion, the latter depending on the mechanical load condition; simultaneously the conditions resulting from the interaction between the mechanical load of the engine and the first phase of combustion are reflected in the course of said displacement.

At the operation of the engine the injection of the cooling water defined by the free displacement establishes a self-controlling mechanism, which ensures the cooling needed for the complete combustion of the fuel without the formation of nitrogenoxydes, by means of evaporation of the cooling water injected, with the aid of of the energy and work of the steam generated and condensation of the exhaust steam; said mechanism converts a significant part of the cooling heat into mechanical work and ensures the separation of the soot formation and toxic gases together with the waterdrops precipitated in the silencer.

In comparison with the solutions known hitherto, the cooling organ according to the invention may be essentially considred as a precombustion chamber with movable walls which delivers the cooling medium to the cylinder space in a self-controlled quantity after expansion has taken place.

In internal combustion engines with forced pistons, running at a relatively low temperature and under low pressure, compressed air can be used with good results; contrasting to that, in free piston internal combustion engines running at a high temperature and under high pressure, the use of a cooling medium with a higher heat extraction, expediently water steam, is imperative. When using free piston internal combustion engines, evaporation inertness of water does not involve any problems, since the pressure prevailing in the cylinder space approximates, even surpasses the critical pressure, 225 atm; above the pressure conversion of water into superheated steam takes place explosionlike, without vaporization. The period of evaporation, amounting to a thousandth of a second, becomes possible by the special shape of the cooling organ, when the pressure prevailing in the inner space is exerting an effect on a surface, surpassing by 20–50-fold the surface of the injecting piston, whereby pressure of injection will surpass 100 atm; consequently the water to be injected arrives in a condition of energy corresponding to that of the steam, into the injecting bore, i.e. cooling effect in the cylinder space is exerted by steam and not by water.

An example of the realization of the invented idea is shown in the drawings enclosed, where FIG. 1 is showing the cooling -system according to the invention, FIG. 2 illustrates a form of execution of the cooling water injection organ /enlarged, FIGS. 3 and 4 are showing the organ serving for the delayed opening and accelerated closing of the injecting organ and the organ performing gradual opening of the same, respectively.

The cylinder 1 of the engine is closed with the aid of the screws 7, by means of the cover 4. The bushing 3 arranged in the cylinder 1 is sliding in the working piston 2, sealed by the piston ring 6. The fueljet 10 is screwed into the cover 4. The screw-spring 9 bearing up against the cover 4 is pressing the movable plate 8 of the cooling organ by a significant force to the flange of the bushing 3.

In the movable plate 8 there are machined several in our example there are five/ cylindrical bores 11; the pistons 12 fixed onto the cover 4 are tightly fitted into the cover. The cylindrical bores 11 are connected to the cylinder space 5 through the injecting bores 21, on the lower part of the cylindrical bores there is a closing element arranged, expediently a water-jet closing element, 19, 20, composed of two halves.

In the middle part of the pistons 12 the bores 15 are formed. The cooling water distributing channel 14 is connected to the upper ends of the bores 15, whereas the lower ends of the bores 15 are closed by a check valve, incorporating the lock-spring 18 and the ball 13. The locking ring 17 fixed onto the cover 4 by means of the screws 22 is serving partly for fixing the pistons 12, and partly it is closing the distributing channel 14 by inserting the sealing element 23. The coupling element 16 — connected to the distributing channel 14 — ensures the inlet of the cooling water of low pressure.

The manner of working of the cooling system is, as follows:

The piston 2 is moving upwards and compresses the air within the cylinder space 5, subsequently the fuel-jet 10 performs injection at a convenient position of the piston 2. The flame pillar, formed in the cylinder space 5 displaces the movable plate 8 in relation to the screw-spring 9, while the pistons 12 are penetrating into the cylindrical bores 11. The water pressure prevailing in the cylindrical bores 11 opens the waterjet closing elements 19, 20, and steam is being injected into the cylinder space 5 through the injecting bores 21.

The steam-jets injected are cooling the cylinder space 5 and evaporation takes place vehemently, explosion-like; the resulting the high pressure mixture, composed of gas and water steam displaces the piston 2 downwards, whereas the pressure prevailing in the cylinder space is reduced to such an extent that the movable plates 8 are pushed back by the screw springs 9, as a result the volume of the cylindrical bores are increased; due to the displacement of the ball 13 in relation to the lock spring 18 the cylindrical bores 11 are filled up with cooling water through the bores 15, the excessive back run of the movable plate 8 has been limited by butting on the cover 4.

The cooling water injecting organ of the cooling system illustrated in FIG. 1 is shown enlarged, in details in FIG. 2. From said figure it may be seen that between the piston 12 and the cover 4 there is an elastic element 24 inserted. During the back run of the movable plate 8 displacement of the piston 12 in relation to the elastic element is limited to a certain extent by the water pressure prevailing in the cylindrical bore, simultaneously the water — jet closing elements 19, 20 are opened, as a consequence injection into the cylinder space 5 takes place through the injection bore 21.

The water-jet closing elements 19, 20 and the elastic element 24 accomplish with a good approximation the quantity of the water to be injected correspond to a cubical parabola, in dependence, on the displacement.

The water injecting organ is insensitive to undulating pressure waves but it shows a certain sensitiveness to the significant displacement of the movable plate 8, reacting by increasing the quantity of cooling water; as a consequence of said reaction the combustion — correlated to the increase of the pressure — takes place in the free piston Diesel - engine in a convenient way.

For the sake of a better distinctness, the elastic element 24, shown in cross-section in FIG. 2, is presented in a top view in FIG. 3. The elastic element is in the shape of a cylindrical body, made of an elastic corrosion-resistant steel base material, said body being broken through six radial bores equally distributed in the middle height of said body, whereby the radial bores — alternating from the bottom and the top — are opened by milling under an angle of 45°.

Shaping can be performed relatively easily, by which an elastic element with excellent spring characteristics can be obtained.

In a similar way, the water-jet closing elements 19, 20 possessing ideal operating parameters and illustrated axonometrically in FIG. 4, can be prepared without difficulty, said elements are made of an elastic corrosion-resistant steel base material, with a semi-cylinder jacket, having a flat surface at the bottom and limited at the top by a conical pit, the parting plane of which is ground with high accuracy.

The water-jet closing elements 19, 20 are pressed to each other with their parting plane, since the outer cylindrical jacket fits into the cylindrical bore 11 with a certain overlap; the pressure, being effective from below, is pressing the water-jet closing elements 19, 20 together in a selfclosing manner, while the pressure, being effective from above, in the direction of the upper conical pit, opens — after having reached a certain pressure value — a narrow oblong slit in the middle part, through which cooling water may be injected. Both of the water-jet closing elements 19, 20 are deflecting in a similar way in relation to each other, consequently between said elements no metallic friction will occur, resulting in a prolonged useful life of the system. The slot between the water-jet closing elements 19, 20 is opening gradually, the magnitude of the slot being proportional to the momentum, whereby said proportionality ensures gradual starting of injecting and specific throttling of constant magnitude, respectively.

The main advantage of the cooling system according to the invention lies in that the contaminations in exhaust gases can be significantly reduced, simultaneously increasing the actual efficiency of the engine.

A further advantage lies in that under the highest pressure condition of the inner space the cooling organ is able to perform a free movement, consequently mechanical stress on the cylinder head may be reduced to the minimum; the energy generated by the cooling steam is to be considered as advantageous not only in regard to the increase of mechanical output but also from the point of view of the increased operating stability of the engine.

By applying the cooling system according to the invention all cooling problems can be optimally solved, on the other hand contaminations in the exhaust gas can be significantly reduced in the two-stroke internal combustion Diesel engines.

I claim:

1. In an internal combustion engine, especially a two-stroke internal diesel engine, having a piston, a cover, fuel injection means in said cover and a cylinder space: a cooling device comprising an annular movable plate confining in part said cylinder space and located substantially opposite said piston, said annular movable plate surrounding said fuel injection means, a plurality of recesses substantially uniformly spaced in said movable plate around said fuel injection means, a plurality of pistons mounted in said cover and fitted into said recesses respectively, a bore in each of said pistons, a channel in said cover for distributing cooling water, the end of each of said bores remote from said cylinder space being connected to said channel, check valve means for closing the other end of each bore adjacent said space, said check valve means including a spring and a ball, an injection bore of reduced diameter connecting the recesses formed in said movable plate to the cylinder space, springs arranged between said movable plate and said cover and being pre-stressed such that displacement of the movable plate toward said cover will take place only when the gas pressure in said cylinder space surpasses the critical pressure of water vapor of approximately 225 atmospheres during combustion of the fuel in said cylinder space, said pistons pressing water from the recesses in the movable plate under high pressure surpassing 1000 atmospheres through said injection bores into the cylinder space, whereby the water while passing through said injection bores evaporates in an explosion-like manner.

2. A cooling device according to claim 1, comprising means for delaying opening and accelerating closing of said injection bores.

3. A cooling device according to claim 1, wherein said means for delaying opening and accelerating closing of said injection bores comprises resilient means between said pistons and said cover, the spring force of said resilient means as a function of the displacement being a cubical parabola.

4. A cooling device according to claim 1, comprising means for gradually opening said injection bores, said last mentioned means comprising closing means arranged in the respective recess and opening a relatively narrow gap under the influence of the high internal pressure therein.

5. A cooling device according to claim 3, wherein said resilient means forms a cylindrical body made of a corrosion-resistant steel-base material, said resilient means being provided with six radial bores equally distributed over the center of said cylindrical body, said radial bores being cut open alternately from the top and bottom of said body at an angle of approximately 45°.

6. A cooling device according to claim 4, wherein said closing means is made of a resilient corrosion-resistant steel-base material, each closing means comprising two semi-cylindrical jackets, limited in one direction by a flat surface and in the other direction by a substantially conical depression, a cylindrical outer mantle being ground into a plane separating said two semi-cylindrical jackets, the elements fitting the respective cylindrical bore with an overlap.

* * * * *